Oct. 15, 1935.  R. A. BEVERLEY  2,017,229
METHOD AND APPARATUS FOR HEATING GALVANIZING TANKS
Filed Dec. 22, 1933  2 Sheets-Sheet 1

INVENTOR.
REGINALD A. BEVERLEY
BY *[signature]*
ATTORNEY.

INVENTOR.
REGINALD A. BEVERLEY
BY
ATTORNEY.

UNITED STATES PATENT OFFICE 2,017,229

METHOD AND APPARATUS FOR HEATING GALVANIZING TANKS

Reginald A. Beverley, Chicago, Ill., assignor to The Carborundum Company, Niagara Falls, N. Y., a corporation of Pennsylvania Application December 22, 1933, Serial No. 703,659

4 Claims. (Cl. 263—42)

This invention relates to improved methods of heating and improvements in heating furnaces. More particularly the invention relates to a method and apparatus for heating galvanizing tanks.

In galvanizing operations it is desirable to maintain the molten zinc at a temperature suitable for galvanizing and prevent the temperature of the zinc near the walls of the container, which is ordinarily an iron tank, from reaching the point at which zinc and iron react. When the two metals react the result is dross which drops to the bottom of the tank and represents a loss of zinc. Furthermore, "hot spots", due to uneven heating may develop in the walls of the iron tank. At these points the zinc and iron react at a relatively rapid rate with the result that holes often occur causing loss of zinc and making it necessary to replace the tank. These difficulties all have their origin in the lack of control of heating in previous method and apparatus, resulting in variation in temperature and uneven heating of the heat transmitting surface of the galvanizing tank.

An object of this invention is to provide a method of heating whereby the heat is evenly applied to the heat transmitting surface and "hot spots" are avoided or eliminated.

Another object is to provide an improved furnace for carrying out the improved heating method of the invention.

Other objects will appear from the following description, appended claims and accompanying drawings.

The method of this invention contemplates impinging radiant heat on a side wall of a galvanizing tank and simultaneously passing spent gases from the combustion source of such radiant heat over the surface of the wall on which the radiant heat impinges to distribute the heat more evenly by convection and eliminate "hot spots" by the cooling effect of the gases.

Galvanizing tanks are ordinarily substantially square in cross-section and have a length several times the depth. By the method of the present invention combustion of fuel is caused to take place adjacent and out of contact with the long sides of such a tank. Radiant heat from the combustion is caused to impinge on the adjacent sides of the tank. The transfer of heat from the points of combustion to the walls of the tank by radiation is an efficient method and promotes a substantially even distribution of heat to the walls. The withdrawal of heat from the zones of combustion cools the products of combustion so that when they are withdrawn from the zones of combustion they are at the temperature most desirable for direct contact with the walls of the tank. According to the present method the spent gases are caused to travel over all parts of the walls which are exposed to the radiant heat. The passage of the spent gases tends to equalize the distribution of heat to the walls of the tank. Despite the equalizing effect of transmitting heat by radiation the source of radiant heat nearest a zone of combustion will be hotter than sources of radiant heat not so near a zone of combustion. The hottest source of radiant heat will tend to transmit heat most rapidly to the nearest point on a wall of the tank. Consequently that point on the tank will tend to be hotter than surrounding points although the difference may not be such as to develop a "hot spot". The passage of spent gases over the surfaces of the walls of the tank thus tends to equalize further the distribution by imparting heat to the cooler parts of the walls and, withdrawing heat from any excessively heated portions of the combustion chamber and tank walls. The combined diffusing effect of the transmission of heat by radiation and the circulating of the spent gases prevents "hot spots" and tends to hold all parts of the walls at a uniform temperature, preferably at the maximum permissible temperature below the point at which reaction between the zinc and iron occurs.

When galvanizing tanks are in use there is a constant withdrawal of heat from the bath by the articles being dipped. It is necessary therefore, to impart heat to the tank at as rapid a rate as possible. This relation is such that the production rate of a galvanizing tank depends largely on the rate of transmission of heat to the tank. As no portion of the tank wall, through which the heat is transmitted, should be permitted to attain the temperature at which the zinc will react with the iron of the tank, it is highly important that all portions of the tank walls should be maintained at the maximum permissible temperature. The present invention affords a method and means of transmitting heat at a maximum rate with even distribution of heat, avoiding the formation of dross from the tank walls and the occurrence of "hot spots".

The apparatus of the present invention provides a furnace having a combustion chamber extending along a side of a galvanizing tank and spaced therefrom to provide a predetermined distance between the tank and the nearest wall of the combustion chamber. Coextending with and adjacent to the combustion chamber a second chamber is provided, located preferably below or above the combustion chamber. In the latter positions the wall of the second chamber nearest the tank constitutes a continuation of the corresponding wall of the combustion chamber. The two chambers may be so designed with respect to the tank that their common inner wall is substantially coextensive with all or a portion of the length of the adjacent wall of the tank. The firing point of the furnace is located at one end and the fuel used is preferably oil or gas, although solid fuels may be used, with suitable apparatus. The firing means are arranged to shoot a long flame into the relatively long narrow combustion chamber. Means are provided to introduce the products of combustion from the combustion chamber into the adjacent second chamber. This means may be a connection at the back of the furnace, that is, the end opposite the firing end or a series of openings connecting the two chambers and spaced along all or a portion of the length of the wall between the two. These openings may be arranged to gradually, or by steps, increase in size and frequency of occurrence, in the direction toward the end of the furnace away from the burner. The second chamber is provided with openings in the wall adjacent the tank leading to the space between the furnace and the tank. The furnace may be so constructed that these openings and the connections between the two chambers may be regulated, as to size, number and location to suit the needs of a particular location. The space between the furnace and the tank is suitably enclosed on the top, bottom and ends, and provided with vents in the roof or floor depending on the relative location of the two chambers. These vents lead to a suitable flue and may be located to give the best circulation of waste gases through the space as hereinafter described. The furnace is of course suitably constructed of refractory material and the wall which is adjacent the tank should be of material which can absorb and radiate heat quickly. For example a wall composed principally of silicon carbide is very efficient for this purpose, aside from its refractoriness. By adjusting the size and/or number of openings between the chambers the length of flame in the combustion chamber can be controlled and varied to vary the amount of heat transmitted by radiation and to vary the temperature of the gases passing into the second chamber by retaining them in the combustion chamber for a longer time.

The furnace of the present invention may be arranged to extend along a side of the tank with a similar furnace on the opposite side. Other arrangements may be made depending on the shape and size of the tank. For example, if the tank is very long with respect to its width four furnaces may be provided extending from each corner along the long sides with the ones on each side having their back ends adjoining.

The invention will be further described and illustrated by reference to the accompanying drawings but it will be understood that they illustrate merely one embodiment of the invention, which is capable of other uses and embodiments and is limited only by the claims.

In the drawings—

Figure 1:
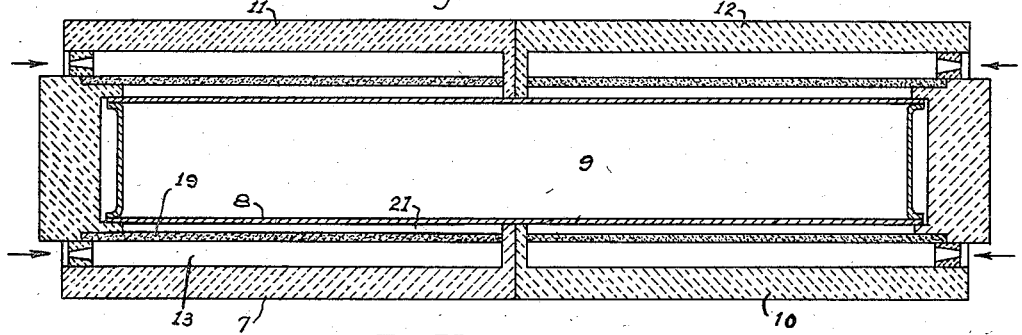
Figure 1 is a diagrammatic plan view in cross-section showing the relative location of furnaces to the tank in a galvanizing apparatus constructed according to the present invention.
Figure 2:
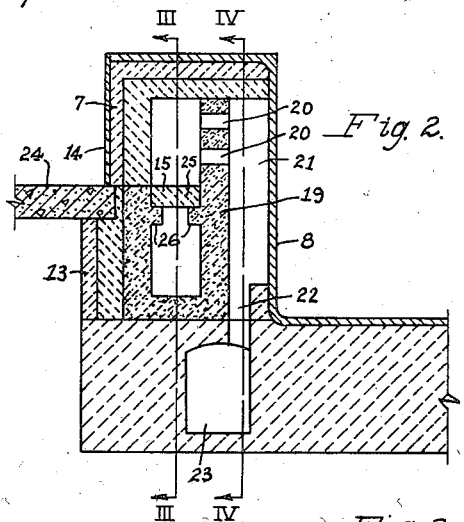
Figure 2 is a transverse vertical section of a furnace constructed according to the present invention.
Figure 3:
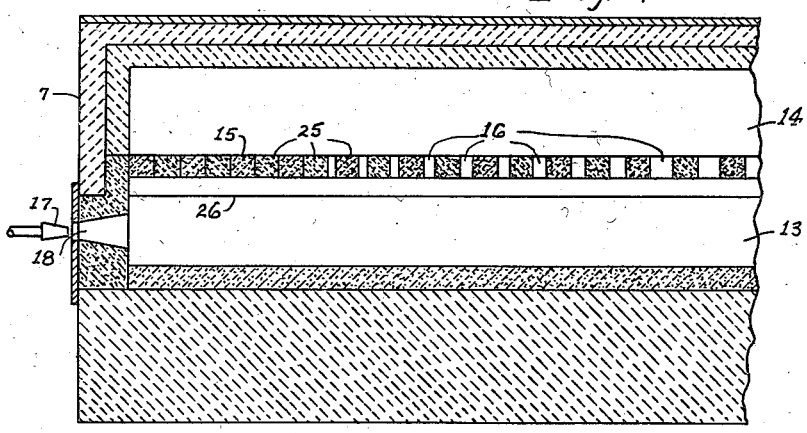
Figure 3 is part of a section along lines III—III.
Figure 4:
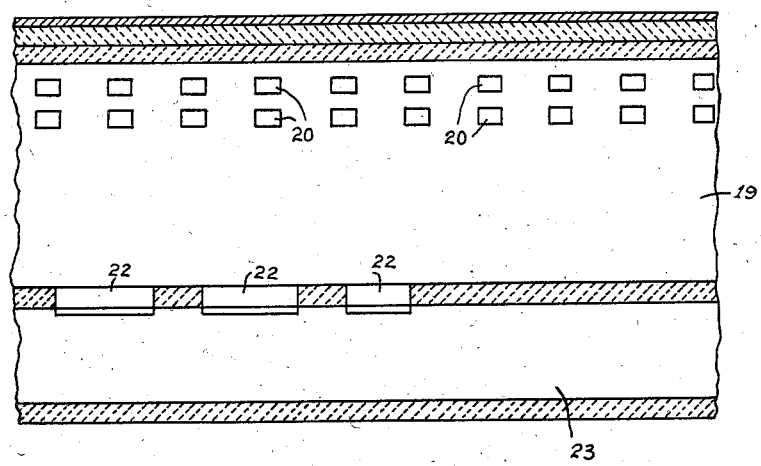
Figure 4 is part of a section along lines IV—IV.
Figure 5:
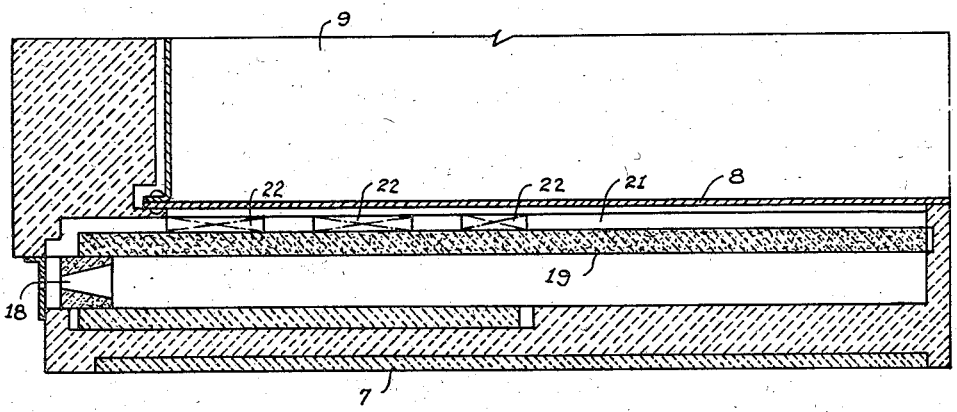
Figure 5 is a horizontal section through the combustion chamber of a furnace built according to the present invention.

The furnace 7 extends along a wall 8 of the galvanizing tank 9. As shown diagrammatically in Figure 1 four furnaces, 7, 10, 11 and 12, may be used to heat the tank 9, with furnaces 7 and 10, and 11 and 12, respectively adjoining at the middle of the side walls, and with the firing ends of the furnaces at the four corners of the tank as indicated by the arrows.

The furnace 7 comprises a combustion chamber 13 and a second chamber 14, located above it, and separated from it by a wall 15 provided with openings 16 connecting the two chambers. The combustion chamber 13 is provided at one end with a burner 17 and opening 18 for burning fuel in the combustion chambers. The inner and outer walls of the furnace are made of suitable refractory material and the wall 19, closing the two chambers along the side adjacent wall 8 of the tank is preferably of a material which will readily absorb heat from the combustion chamber 13 or chamber 14 and radiate it to wall 8 of the tank; for example, a refractory composed principally of silicon carbide. To assist combustion the remaining walls of combustion chamber 13 may also consist, at least in part, of this material.

The wall 19 is provided with openings 20 which connect chamber 14, along the length thereof with the space 21, between the wall 19 and wall 8.

The space 21 is provided with flues 22, located, in this illustration, toward the firing end of the furnace in the floor of space 21, and connecting with main flue 23, located below the furnace 7 and connecting with a stack (not shown).

For convenience in access to the tank the apparatus may be set somewhat below the floor level as indicated by the location of floor 24.

In operation the fuel is burned in chamber 13 and the products of combustion pass up through openings 16 into chamber 14. The spent gases from the combustion pass out of chamber 14 through openings 20 into the space 21, sweeping over the side wall 8 of the galvanizing tank, and are withdrawn through flues 22 and 23. Wall 19 absorbs heat from the combustion and radiates it to the side wall 8 of the tank, across the space 21. The gases pass over the wall and evenly distribute the heat and equalizing any uneven heating by radiation. For example, the gases first strike the wall 8 in its upper portion, which naturally receives less radiant heat than the lower portion near the combustion chamber. The gases emerging from the openings 20 will ordinarily be hotter than the upper portion of wall 8 of the tank. Due to the cooling effect of contact with the upper portion of wall 8, and the tendency of the lower portion of wall 8 to be hotter than the upper portion, the gases will tend to be at substantially the same, or lower, temperature than the lower portion of the wall when they pass it. The gases thus tend to heat the upper portion of the wall more than the lower portion which they meet after they have been cooled by contact with the upper portions. In this way the upper and lower portions of the wall 8 will be maintained at substantially the same temperature. Also the gases in passing over wall 8 tend to equalize local unevenness in heating. For example, incipient "hot spots" may be cooled by the gases before they have a chance to develop.

The rate of combustion and the length of the flame in combustion chamber 13 may be regulated by varying the number and size of openings 16. The wall 15 is, in this instance, made up of loose bricks 25 supported by shoulders 26. Thus the bricks 24 may be shifted to provide any arrangement of openings 16 found desirable. However, the openings will generally be located with greater frequency and size toward the rear of the furnace to prevent the flame from rising immediately into chamber 14. The openings 20 may be arranged to provide any distribution of gases found desirable. However they will generally be spaced along the whole length of wall 19 to insure the passage of gases over the whole surface of wall 8 exposed to radiant heat. Since the openings 16 will be mostly toward the rear of the furnace the gases will largely pass into chamber 14 at the rear of the furnace. To induce the gases to pass along the length of chamber 14 and space 22 toward the front of the furnace the flues 22 are preferably located toward the front. This tends to equalize the distribution of gases in chamber 14 and also in space 21, to accomplish the even heating of the present invention.

It will thus be seen that the present invention provides a method and apparatus whereby a galvanizing tank may be operated with maximum production rate and lowered zinc losses due to less formation of dross from the tank walls. The decrease in percentage of dross formed, over previous means, may amount to fifty percent or more. The frequency of the removal of dross may be reduced from three times a week in many cases to once a week. Because of the lowered formation of dross from the tank walls and the elimination of "hot spots" the life of the tank is considerably lengthened. It has been found that tanks heated according to the present invention last about twice as long as in previous means of heating, with a larger production rate. As mentioned above the uniform heating enables heat to be transmitted to the tank at a faster rate, increasing the possible production rate. In an experimental, but commercial size, installation of a furnace according to the invention it was found that the total saving in the cost of galvanizing, taking all factors into consideration, was more than twenty percent.

I claim:

1. A furnace for heating a galvanizing tank which comprises a combustion chamber extending along a wall of the said tank adjacent thereto and spaced therefrom, a wall of refractory material closing the said combustion chamber on the side adjacent the said tank composed of material capable of absorbing heat from the said combustion chamber and radiating the same to the said wall of the tank, a second chamber adjacent the said combustion chamber and extending along the length thereof and adjacent and spaced from the said wall of the tank and adapted to receive products of combustion from the said combustion chamber, a wall closing the said second chamber on the side adjacent the said wall of the tank and provided with openings connecting the said second chamber and the space between the said second chamber and the said wall of the tank, and a flue leading from the said space.

2. A furnace for heating a galvanizing tank which comprises a combustion chamber extending along a wall of the said tank adjacent thereto and spaced therefrom, a second chamber adjoining and coextending with the said combustion chamber and adjacent and spaced from the said wall of the tank and adapted to receive products of combustion from the said combustion chamber, a wall composed principally of silicon carbide closing the said chambers on the side adjacent the said wall of the tank to absorb heat from the combustion in the furnace and radiate it to the said wall of the tank and provided with openings connecting the said second chamber and the space between the said wall of silicon carbide and the said wall of the tank, and a flue leading from the said space.

3. A furnace for heating a galvanizing tank which comprises a combustion chamber extending along a wall of the said tank adjacent thereto and spaced therefrom, a wall of refractory material closing the said combustion chamber on the side adjacent the said tank composed of material capable of absorbing heat from the said combustion chamber and radiating it to the said wall of the tank, a second chamber located above and adjoining the said combustion chamber and extending along the length thereof, a wall separating the said chambers and provided with openings connecting the said chambers and increasing in size and frequency toward the end of the furnace opposite the firing end, a wall closing the said second chamber on the side adjacent the said wall of the tank and provided with openings connecting the said second chamber and the space between the said second chamber and the said wall of the tank, walls enclosing the said space, and a flue in the bottom wall of the said space relatively near the firing end of the furnace.

4. A furnace for heating a galvanizing tank which comprises a combustion chamber extending along a wall of the said tank adjacent thereto and spaced therefrom, a second chamber located above and adjoining the said combustion chamber and extending along the length thereof and adjacent and spaced from the said wall of the tank, a wall separating the said chambers and provided with openings connecting the said chambers and increasing in size and frequency toward the end of the furnace opposite the firing end, a wall composed principally of silicon carbide closing the said chambers on the side adjacent the said wall of the tank and provided with openings spaced along the length thereof connecting the said second chamber and the space between the said wall of silicon carbide and the said wall of the tank, walls enclosing said space, and a flue in the bottom wall of the said space relatively near the firing end of the furnace.

REGINALD A. BEVERLEY.